(12) United States Patent
Takahashi

(10) Patent No.: US 6,923,150 B2
(45) Date of Patent: Aug. 2, 2005

(54) VALVE TIMING CONTROL SYSTEM FOR AN INTERNAL COMBUSTION ENGINE

(75) Inventor: Tatsuhiko Takahashi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/655,214

(22) Filed: Sep. 5, 2003

(65) Prior Publication Data
US 2004/0237916 A1 Dec. 2, 2004

(30) Foreign Application Priority Data
May 29, 2003 (JP) ........................................ 2003-153025

(51) Int. Cl.[7] ................................................ F01L 1/34
(52) U.S. Cl. ................................ 123/90.15; 123/90.16; 123/90.17
(58) Field of Search ......................... 123/90.15–90.18, 123/90.31; 74/568 R; 464/1, 2, 160; 92/121, 122

(56) References Cited

U.S. PATENT DOCUMENTS 5,333,577 A * 8/1994 Shinojima ............... 123/90.15
5,664,529 A * 9/1997 Kato et al. ............... 123/90.15
5,715,779 A * 2/1998 Kato et al. ............... 123/90.15

FOREIGN PATENT DOCUMENTS

| JP | 06-159105 A | 6/1994 |
|---|---|---|
| JP | 2000-064862 A | 2/2000 |

* cited by examiner

*Primary Examiner*—Thomas Denion
*Assistant Examiner*—Jaime Corrigan
(74) *Attorney, Agent, or Firm*—Sughrue Mion, PLLC

(57) ABSTRACT

A valve timing control system for an internal combustion engine is provided, which includes: a crank angle sensor detecting a crank angle corresponding to an internal combustion engine crank shaft rotational angle; an actuator relatively modifying phases of a cam angle with the crank angle; a cam angle sensor detecting the cam angle modified by the actuator; an oil control valve driving the actuator; a target value detection unit calculating a target value according to the internal combustion engine operation state; a cam angle control unit controlling the detected cam angle to coincide with the calculated target value; a learning unit learning a control signal to the oil control valve when the cam angle substantially coincides with the target value; and a failure detection unit detecting failure of the actuator. The failure detection unit modifies a failure detection condition according to whether learning is performed in the learning unit.

11 Claims, 10 Drawing Sheets

VALVE TIMING CONTROL SYSTEM FOR AN INTERNAL COMBUSTION ENGINE

BACKGROUND OF THE INVENTION

1. Field of the Invention

The present invention relates to a valve timing control system for an internal combustion engine for controlling operation timings of an intake valve and an exhaust valve of an internal combustion engine, and more particularly to detection of failure of a valve timing control system.

2. Description of the Related Art

As a conventional valve timing control system for an internal combustion engine, there is a technique in which an operation state of a cam angle modifying unit is detected, a drive signal from a drive unit in a given operation state is learned, and based on this learned value, the drive signal to be calculated by a control unit is compensated (for example, a technique disclosed in JP 06-159105 A).

The above-mentioned conventional valve timing control system for the internal combustion engine includes: a relative rotational angle detection unit for detecting a relative cam angle from a crank angle sensor and a cam angle sensor; a target relative rotational angle calculating unit for calculating a target cam angle which is optimal depending on the engine operation state; a learning unit for learning an output value outputted from a control unit to a drive unit, which was calculated based on a differential between the target relative rotational angle calculated by the target relative rotational angle calculating unit and the relative cam angle detected by the relative rotational angle detecting unit; the control unit for controlling the drive unit according to information obtained from the relative rotational angle detection unit, the target relative rotational angle calculation unit, and the learning unit; the drive unit for driving a valve timing adjusting unit; and the valve timing adjusting unit for modifying the cam angle with respect to the crank angle.

The learning unit learns the output value outputted from the control unit to the drive unit if the differential between the detected value detected by the relative rotational angle detection unit and the calculated value calculated by the target relative rotational angle calculation unit is within a predetermined range. The control unit calculates a control amount based on the learning value and drives the drive unit such that the target relative rotational angle and the relative rotational angle coincide, and makes the valve timing adjusting unit operate at a predetermined operating speed.

Further, there is a valve timing control system for an internal combustion engine, which executes a failure determination if the differential between the target value and the detected value is greater than a predetermined value continuously for a predetermined time duration (for example, a technique disclosed in JP 2000-64862 A).

The conventional valve timing control systems for an internal combustion engine are constructed as described above. According to those techniques, in a case where the drive unit control amount learning value has not yet been learned, the valve timing adjusting unit does not operate at the predetermined operation speed. As a result, in the case where the failure is to be determined in the case where differential between the target value and the detection value continues for the predetermined time duration, there is a danger of the failure being determined erroneously.

SUMMARY OF THE INVENTION

The present invention has been made to solve the above-mentioned problems, and therefore has as an object to provide a valve timing control system for an internal combustion engine, which can prevent an erroneous failure determination, even in a state where a control amount learning value has not yet been learned and is not yet at a correct value.

A valve timing control system for an internal combustion engine according to the present invention includes: a crank angle detection unit for generating a crank angle position signal corresponding to a rotational angle of a crank shaft in an internal combustion engine; a cam angle modifying unit for modifying at least a relative position of a crank shaft and a cam shaft for one of air intake and gas exhaust; a cam angle detecting unit for detecting a cam angle modified by the cam angle modifying unit; a drive unit for driving the cam angle modifying unit; a target value calculating unit for calculating a target value depending on an operation state of the internal combustion engine; a cam angle control unit for controlling the cam angle detected by the cam angle detecting unit to coincide with the target value calculated by the target value calculating unit.

Further, the valve timing control system for an internal combustion engine according to the present invention includes: a learning unit for learning a control signal outputted to the drive unit at a time when the target value and the cam angle substantially coincide; and a failure detecting unit for detecting a failure of the cam angle modifying unit, in which the failure detecting unit modifies a failure detection condition according to whether or not learning is completed by the learning unit.

DETAILED DESCRIPTION OF THE PREFERRED EMBODIMENTS

Embodiment 1

Figure 1:
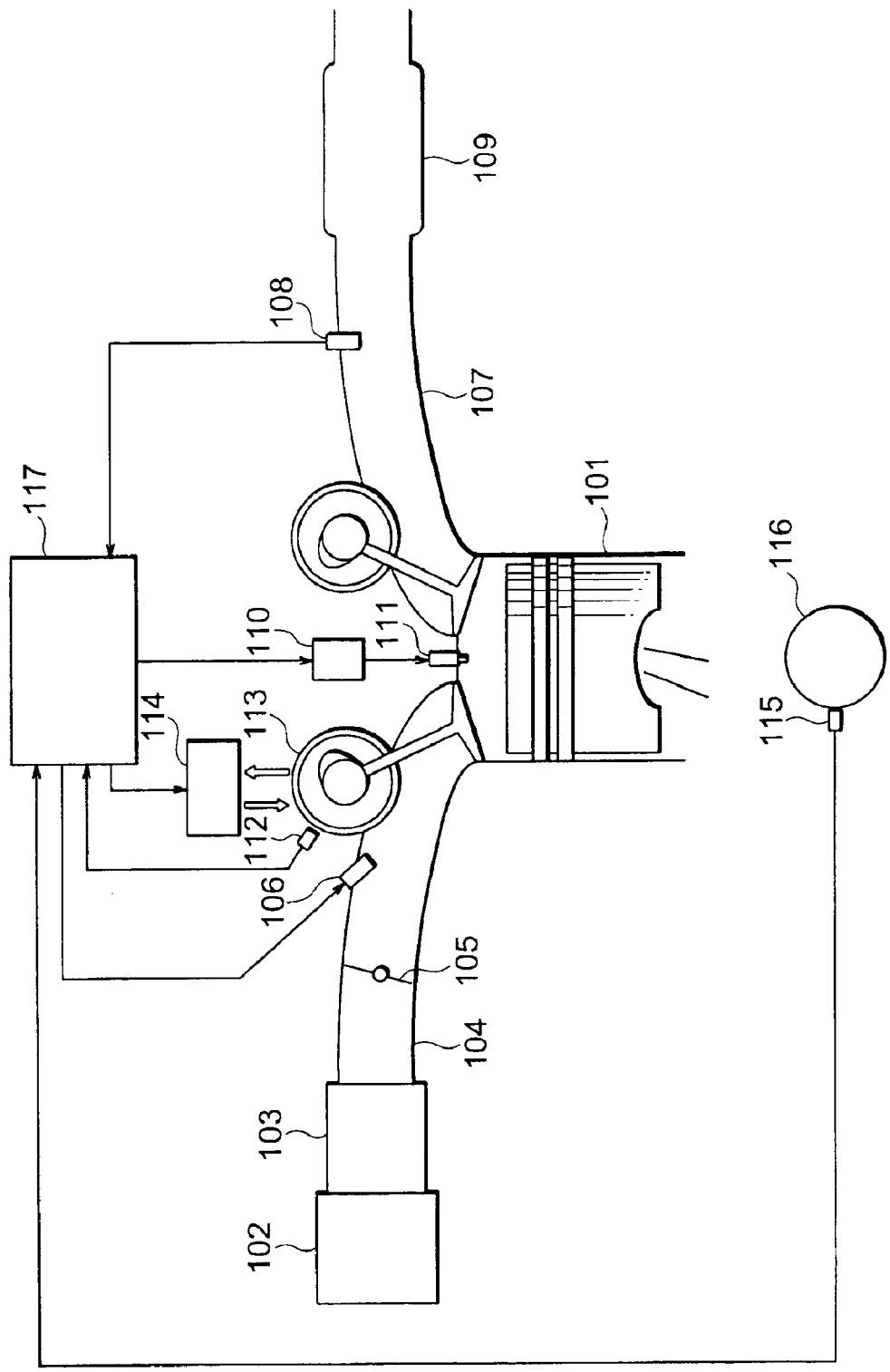
FIG. 1 is a constructional diagram showing a valve timing control system for an internal combustion engine according to the present invention.

FIG. 1 is a constructional diagram illustrating a valve timing control system for an internal combustion engine according to the present invention. The valve timing control system for the internal combustion engine shown in FIG. 1 includes: an internal combustion engine 101; an air cleaner 102 for cleansing air taken in by the internal combustion engine 101; an airflow sensor 103 for quantifying an air amount taken in by the internal combustion engine 101; an intake pipe 104; a throttle valve 105 for adjusting an intake air amount and controlling an output of the internal combustion engine 101; an injector 106 for providing fuel appropriate for the intake air amount; and a spark plug 111 for generating sparks to burn an air-fuel mixture in a combustion chamber of the internal combustion engine 101.

Further, there is provided: an ignition coil 110 for providing high-voltage energy to the spark plug 111; an exhaust pipe 107 for emitting burned exhaust gas; an O2 sensor 108 for detecting a remaining oxygen amount in the exhaust gas; a three-way catalyst 109 capable of simultaneously cleansing THC, CO, and NOx, which are harmful gasses in the exhaust gas; a sensor plate 116 which is provided with a protrusion (not shown in the diagram) at a given position, and serves to detect an angle of a crank attached to a crank shaft and rotated integrally with the crank shaft; and a crank angle sensor 115 for detecting a position of the crank shaft, in which a signal is emitted when the protrusion (not shown in the diagram) from the sensor plate 116 crosses the crank angle sensor 115, to thus detect the crank angle.

Further, there are provided: an actuator 113 serving as a cam angle modifying unit capable of phase-shifting the cam angle relative to the crank angle; a cam angle sensor 112 for emitting the pulse signal caused by the protrusion from the cam angle detection sensor plate, not shown in the diagram like the crank angle sensor, to detect the cam angle; an oil control valve (hereinafter, referred to as an OCV) 114 serving as a driving unit for driving the actuator 113, which switches an oil pressure to the actuator 113 for modifying a cam phase to control the cam phase; and an ECU 117 for performing cam phase control and also performing control of the internal combustion engine 101.

Next, before explaining the cam phase angle control, first, explanation is made of the control of the internal combustion engine 101. The air amount taken in by the internal combustion engine 101 is measured by the air flow sensor 103, and the ECU 117 calculates the fuel amount appropriate for the measured air amount and drives the injector 106. Also, the ECU 117 controls timings of electrification and severance of the ignition coil 110, for creating sparks to the air-fuel mixture in the combustion chamber by the spark plug 111 at appropriate timings. The intake air amount is adjusted by the throttle valve 105, and an output from the internal combustion engine 101 is controlled.

The exhaust gas combusted inside the cylinder is emitted through the exhaust pipe 107, and by means of the catalyst 109 provided midway in the exhaust pipe 107, the harmful substances HC, CO, and NOx in the exhaust gas are cleansed to CO2 and H2O. In order to maximize the cleansing rate at the catalyst 109, the O2 sensor 108 is attached to the exhaust pipe 107 to detect the remaining oxygen amount in the exhaust gas, and the ECU 117 performs the feedback control and adjusts the fuel amount such that the mixed air reaches a theoretical air-fuel ratio.

Figure 2:
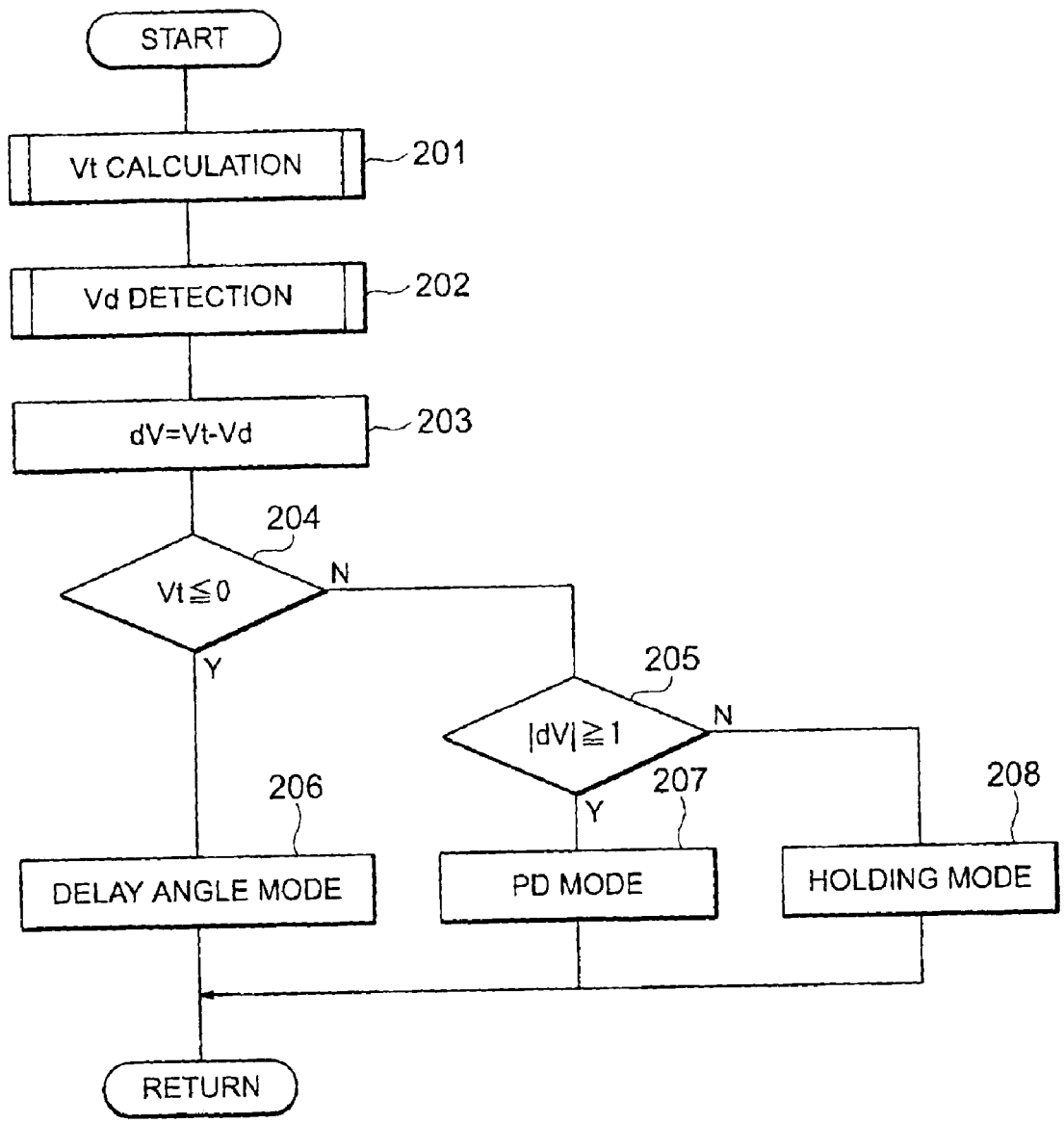
FIG. 2 is a flowchart of selection of a cam angle control mode which is a valve timing, for explaining operations of the present invention.

Next, explanation is made of a valve timing control method by the ECU 117. FIG. 2 shows a flowchart of selection of a cam angle control mode which is the valve timing, the flowchart structuring: a target value calculating unit for calculating a target value according to an operation state of the internal combustion engine; and a cam angle control unit for controlling the cam angle detected by the cam angle detection sensor 112 to coincide with the target value. This processing is performed at a predetermined timing, for example, every 25 [ms].

First, at step S201, a target phase angle (Vt) is calculated. For example, reference is made to a map including a filling efficiency calculated from the intake air amount (the value detected by the air flow sensor 103), and an RPM calculated from the output from the crank angle sensor 115. At step S202, a detected phase angle (Vd) is detected. The detected phase angle is calculated by measuring a time duration between output signals of the crank angle sensor 115 and the cam angle sensor 112. After that, a phase angle differential (dV) shown in the following formula is calculated at step S203.

Phase angle differential (*dV*)=target phase angle (*Vt*)−detected phase angle (Vd)

Then, at step S204 it is determined whether the target phase angle (Vt) is 0 [degCA] or less. If it is 0 [degCA] or less, then at step S206, the cam control mode changes to a delay angle mode. At step S204, if the target phase angle (Vt) is greater than 0, then at step S205, it is determined whether the absolute value of the phase angle differential (dV) is 1 [degCA] or more. If it is 1 [degCA] or more, then at step S207, the cam control mode changes to a proportionate differential control mode (hereinafter, referred to as a PD mode). If it is smaller than 1 [degCA], then at step S208, the cam control mode changes to a holding mode.

Figure 3:
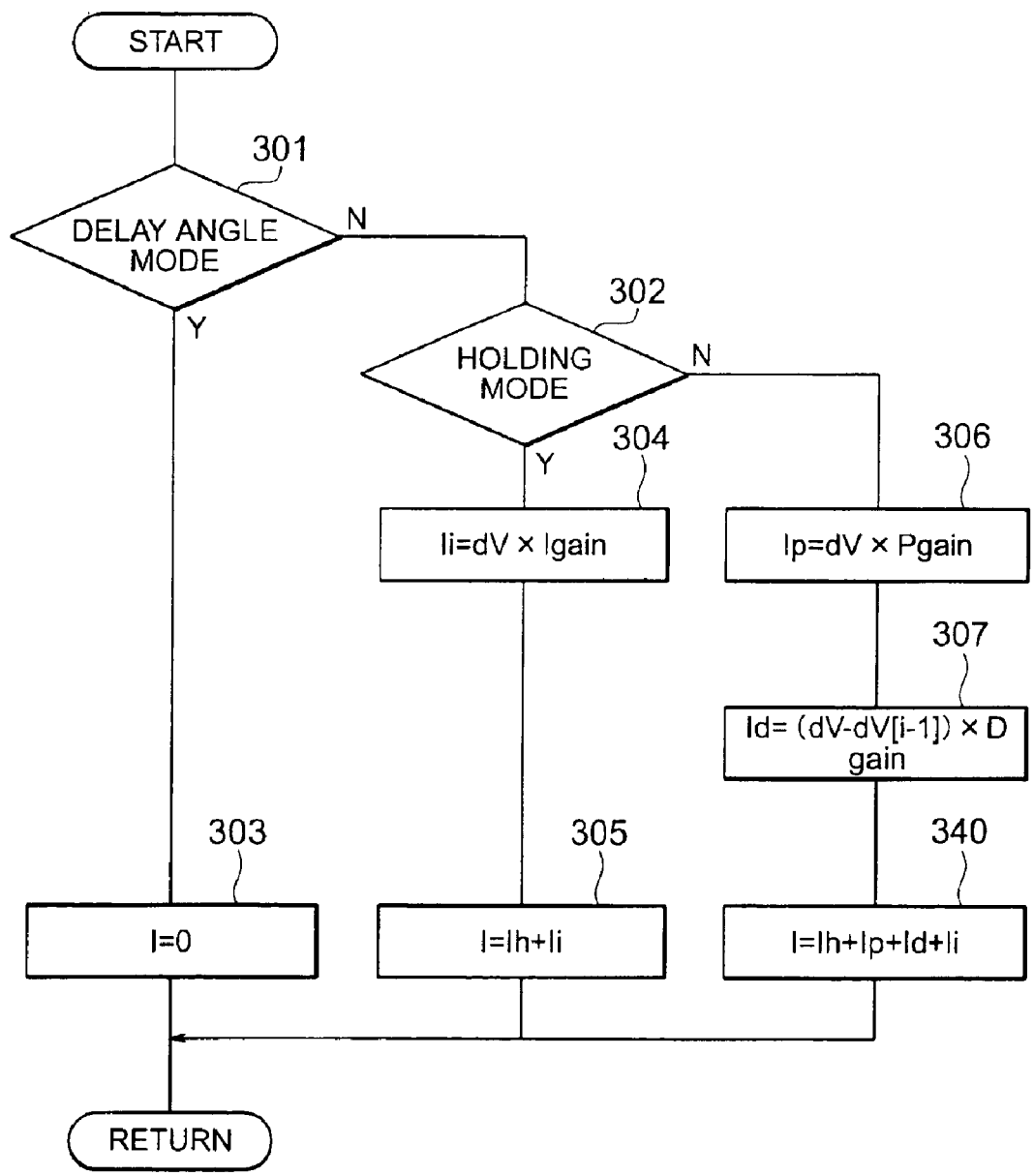
FIG. 3 is a flowchart of a control amount calculation, for explaining operations of the present invention.

Next, FIG. 3 is a flowchart of a calculation of a control amount (control current value) to the OCV 114 by the ECU 117. Following the flowchart of FIG. 2, this processing is performed at a predetermined timing, for example, every 25 [ms]. First, at step S301, it is determined whether the cam control mode is the delay angle mode. If it is the delay angle mode, then at step S303, the control current value (I) is set to 0 [mA]. If it is not the delay angle mode, then at step S302, it is determined whether the cam control mode is the holding mode. If it is the holding mode, then at step S304, an integral value (Ii)=phase angle differential (dV)×integral gain (Igain) is calculated. Then, at step S305, the control current value (I)=holding current learning value (Ih)+integral value (Ii) is calculated.

At step S302, if the cam control mode is not the holding mode, then it is judged as the PD mode, and at step S306, the proportional value (Ip)=phase angle differential (dV)× proportional gain (Pgain) is calculated. At step S307, the differential value (Id)=(phase angle differential (dV)− previous phase angle differential (dV[i−1]))×differential gain (Dgain) is calculated. At step S308, the control current value (I)=holding current learning value (Ih)+proportional value (Ip) +differential value (Id)+integral value (Ii) is calculated. The calculated control current value (I) is converted into a duty value, and the OCV 114 is duty-controlled.

Figure 4:
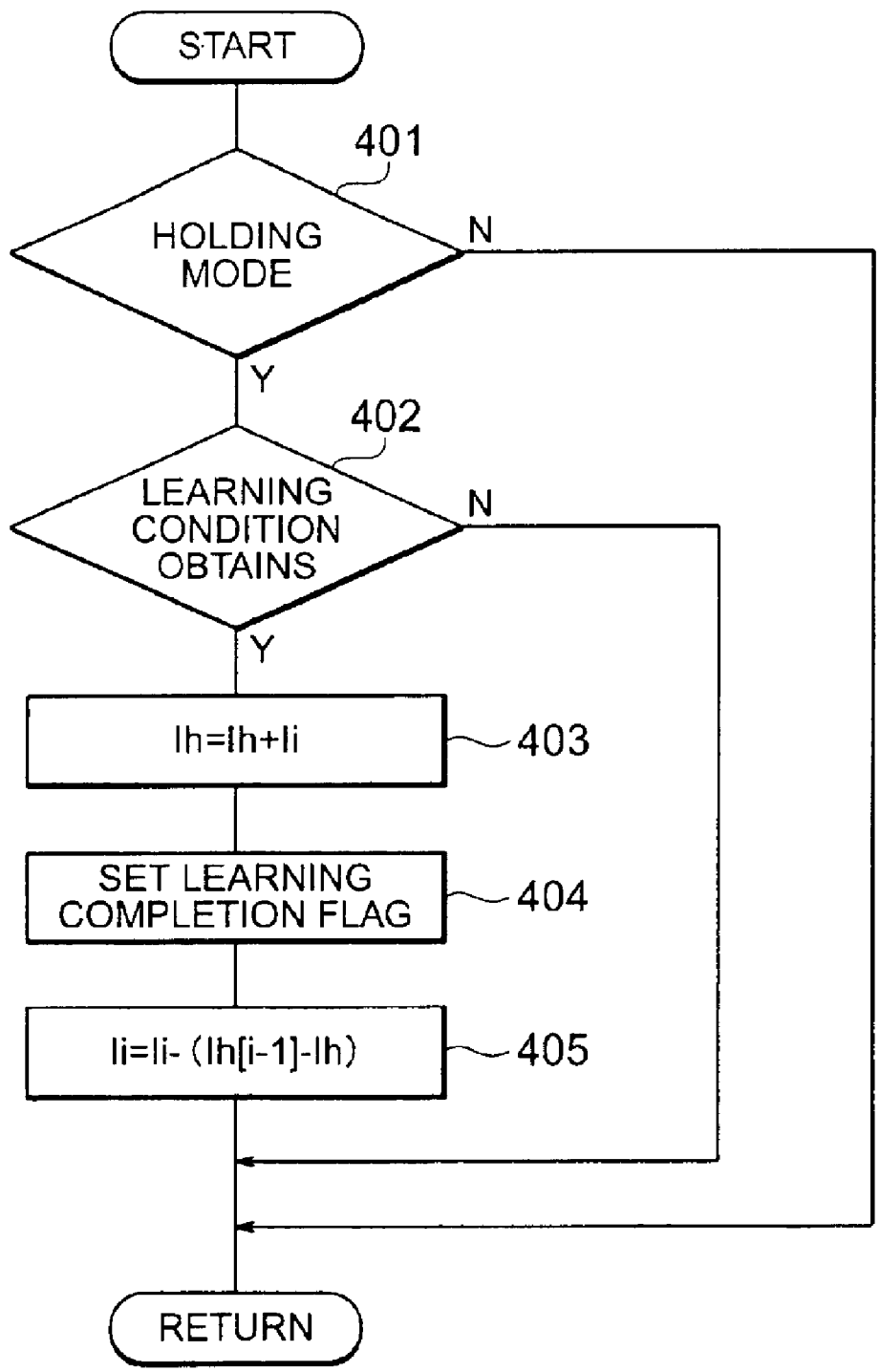
FIG. 4 is a flowchart of holding current learning, for explaining operations of the present invention.

Next, FIG. 4 shows a flowchart of the holding current learning by the ECU 117. The flowcharts of FIGS. 3 and 4 collectively structure a learning unit for learning the control amount (the control current value) to the OCV 114 at the time when the target phase angle and the cam angle substantially coincide. This processing is performed at a predetermined timing, for example, every 25 [ms].

First, at step S401, it is determined whether the cam control mode is the holding mode. If it is not the holding mode, then the processing ends there. If it the holding mode, then at step S402, it is determined whether a learning condition is obtained. The learning condition is that, for example, a difference between the target phase angle and the detected phase angle is within a given range (within±0.3 [degCA]) for a given time period (100 [ms]). In a case where the learning condition is not obtained, the processing ends there.

In a case where the learning condition is obtained, then at step S403, the holding current learning value (Ih) is added to the integral value (Ii), and the holding current learning value (Ih) is updated. At step S404, a flag is set so as to distinguish that the learning of the holding current learning value is completed. At step S405, the difference between the previous holding current learning value (Ih [i−1]) and the holding current learning value (Ih) is subtracted from the integral value (Ii). The holding current learning value and the holding current learning completion flag are backed up with a battery, and even after the ignition key is turned off, their values are held.

Figure 5:
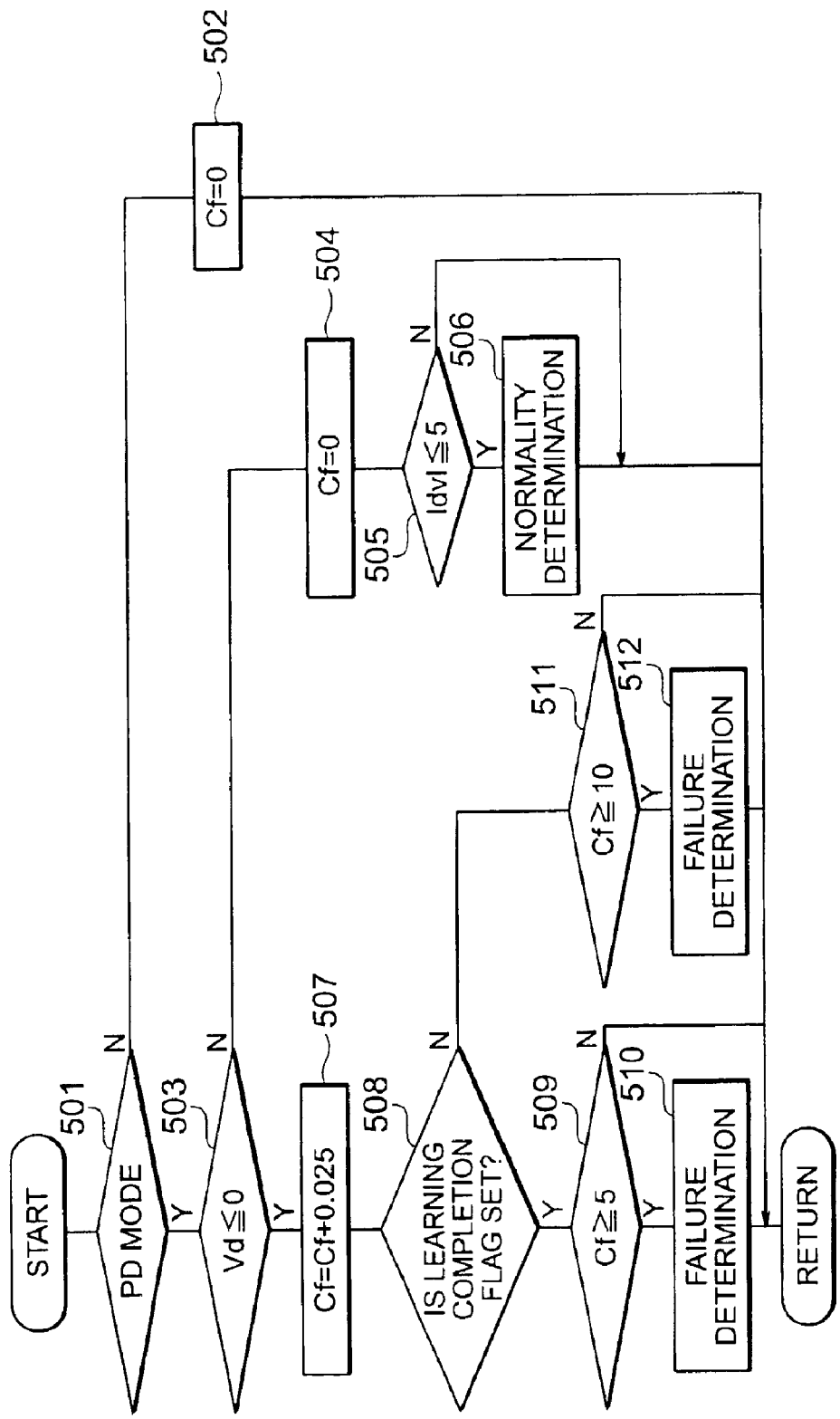
FIG. 5 is a flowchart of a failure determination according to Embodiment 1 of the present invention.

Next, FIG. 5 is a flowchart showing an ECU 117 failure determination and structuring a failure determination unit for determining failure of the actuator 113 serving as the cam angle modifying unit. A failure detection condition is modified according to whether or not the above-mentioned learning is performed by the learning unit. This processing is executed at predetermined periods, for example, every 25 [ms].

First, at step S501, it is determined whether the cam control mode is the PD mode. If it is not the PD mode, then at step S502, a failure determination counter (Cf) is set to 0 [sec] and this processing ends. If it is the PD mode, then at step S503, it is determined whether the detected phase angle (Vd) is 0 [degCA] or less. If the detected phase angle (Vd) is not 0 [degCA] or less, then at step S504, the failure determination counter (Cf) is set to 0 [sec], and at step S505, it is determined whether the phase angle differential (dV) absolute value is 5 [degCA] or less. If it is 5 [degCA] or less, then at step S506, it is determined to be normal.

At step S503, if the detected phase angle (Vd) is 0 [degCA] or less, then at step S507, the failure determination counter (Cf) counts upward. At step S508, it is determined whether the learning completion flag of the holding current learning value has been set. If it has been set, then at step S509, it is determined whether a time period of 5 [sec] or more has elapsed by the failure determination counter (Cf). If the time period of 5 [sec] or more has elapsed, then at step S510, the failure is determined. If the holding current learning completion flag has not been set at step S508, then at step S511, it is determined whether a time period of 10 [sec] or more has elapsed by the failure determination counter (Cf). If the time period of 10 [sec] or more has elapsed, then at step S512, the failure is determined.

In this way, based on whether or not the holding current learning value has already been learned, the failure determination delay time which is the failure determination counter compared value is modified, and at the time when the holding current learning value has already been learned the delay time is shorter than when it has not yet been learned. Accordingly, erroneous failure detection can be prevented when the learning has not yet been performed, and the failure detection can be performed faster at the time when the learning has already been performed.

Further, by switching between performing and not performing the failure determination according to the detected phase angle condition, the erroneous failure determination can be eliminated. Further, the holding current learning value and the learning completion flag are backed by the battery. Therefore, if the learning is performed once, then that value is saved as long as the battery is not removed, and thus an early failure detection becomes possible.

Embodiment 2

Figure 6:
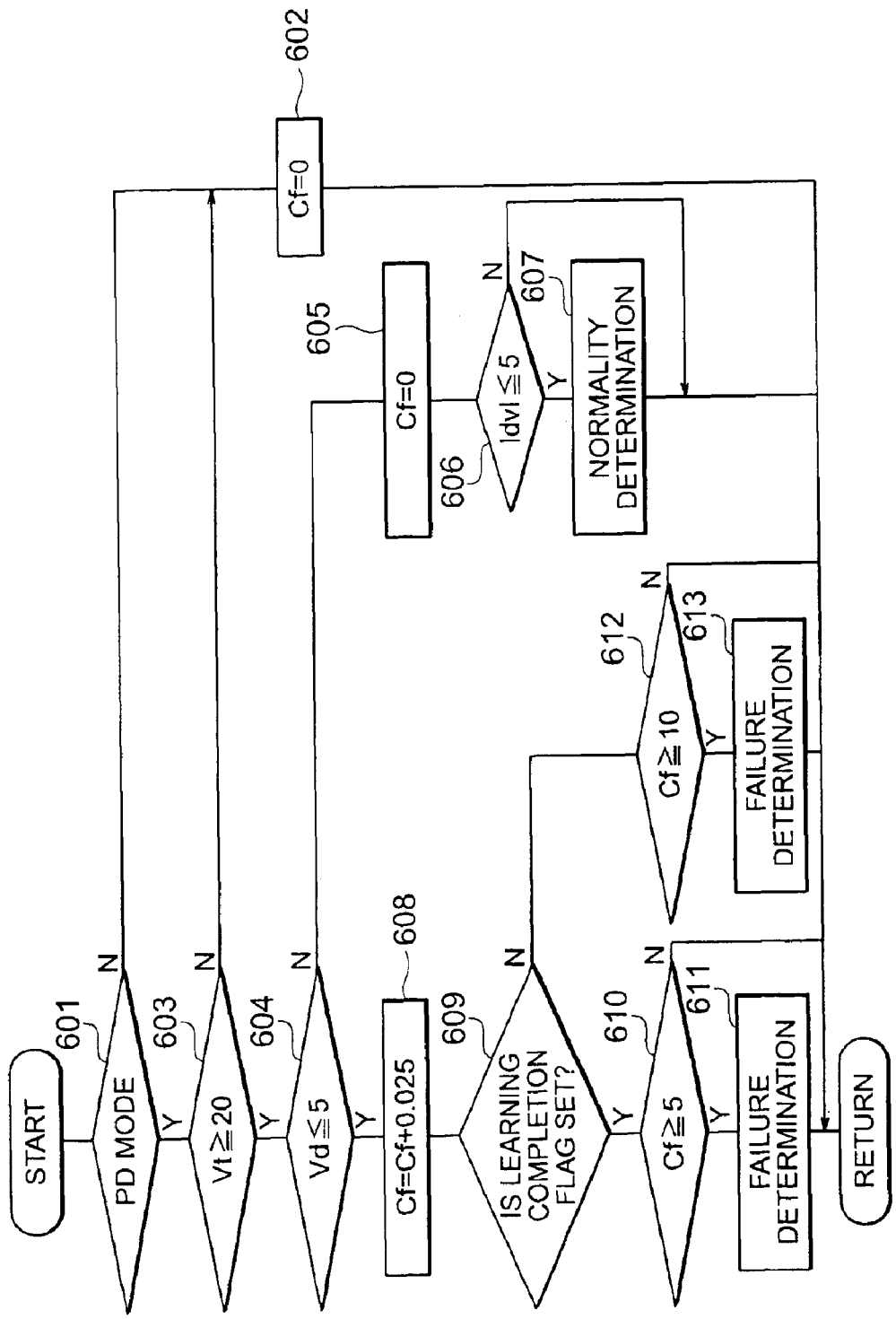
FIG. 6 is a flowchart of a failure determination according to Embodiment 2 of the present invention.

FIG. 6 is a flowchart of a failure determination according to Embodiment 2. This processing is performed at predetermined periods, for example, every 25 [ms]. First, at step S601, it is determined whether the cam control mode is the PD mode. If it is not the PD mode, then at step S602, the failure determination counter (Cf) is set to 0 [sec], and this processing ends. If it is the PD mode, then at step S603, it is determined whether the target phase angle (Vt) is 20 [degCA] or more. If the target phase angle (Vt) is below 20 [degCA], then at step S602, the failure determination counter (Cf) is set to 0 [sec], and this processing ends.

At step S603, if the target phase angle (Vt) is 20 [degCA] or more, then at step S604, it is determined whether the detected phase angle (Vd) is 5 [degCA] or less. If it is not 5 [degCA] or less, then at step S605, the failure determination counter (Cf) is set to 0 [sec], and at step S606, it is determined whether the phase angle differential (dV) absolute value is 5 [degCA] or less. If it is 5 [degCA] or less, then at step S607, it is determined to be normal. If the detected phase angle (Vd) is 5 [degCA] or less at step S604, then at step S608, the failure determination counter (Cf) counts upward.

At step S609, it is determined whether the learning completion flag of the holding current learning value has been set. If it has been set, then at step S610, it is determined whether the failure determination counter (Cf) has counted 5 [sec] or more. If it has counted 5 [sec] or more, then at step S611, the failure is determined. At step S609, if the learning completion flag has not been set, then at step S612, it is determined whether the failure determination counter (Cf) has counted 10 [sec] or more. If it has counted 10 [sec] or more, then at step S613, the failure is determined.

In this way, by switching between determining and not determining the failure using the target phase angle value and the detected phase angle value, and by not performing the failure determination in the case where the target phase angle is below the predetermined value, the erroneous failure determination can be eliminated.

Embodiment 3

Figure 7:
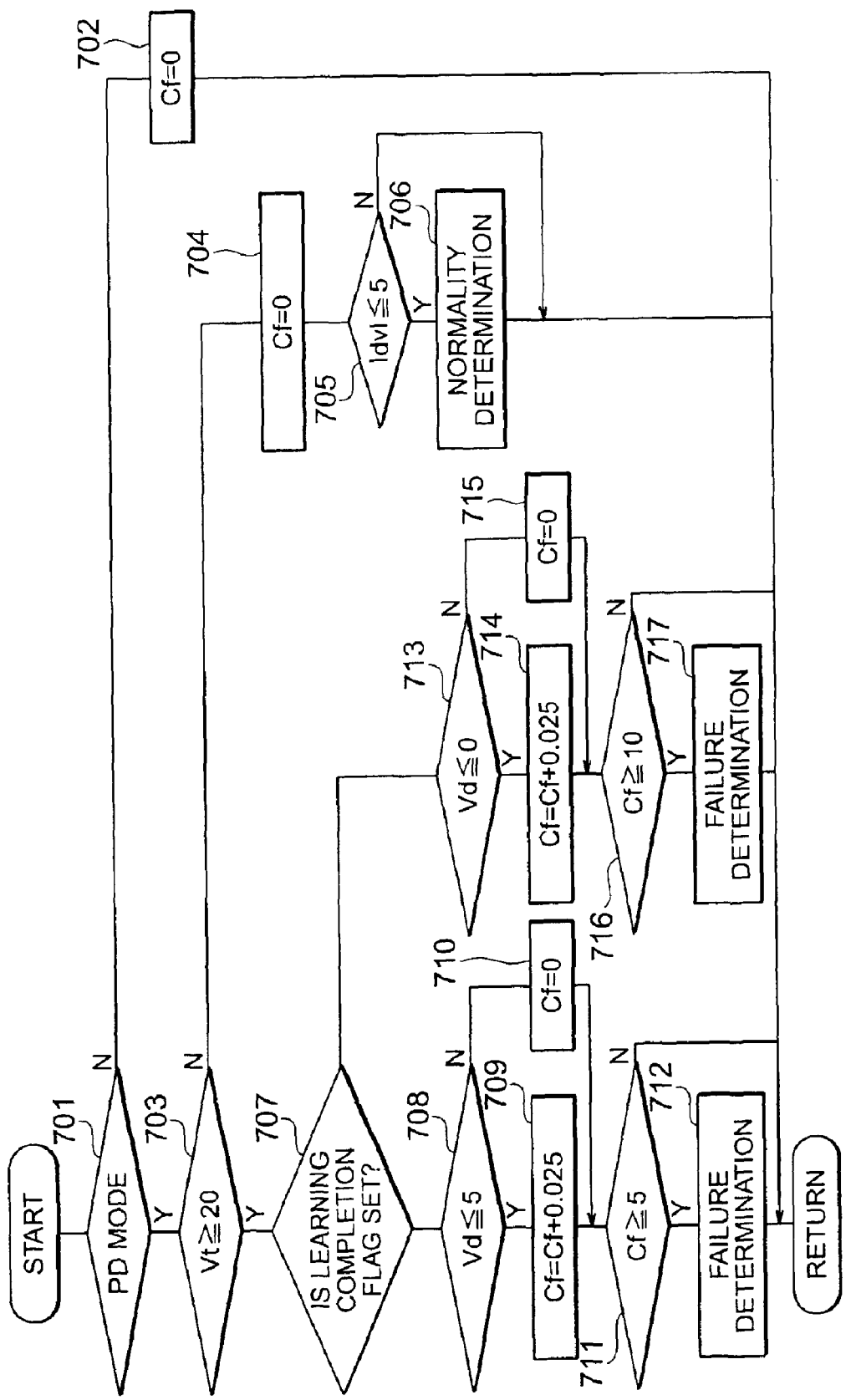
FIG. 7 is a flowchart of a failure determination according to Embodiment 3 of the present invention.

FIG. 7 is a flowchart of a failure determination according to Embodiment 3. This processing is performed at predetermined periods, for example, every 25 [ms]. First, at step S701, it is determined whether the cam control mode is the PD mode. If it is not the PD mode, then at step S702, the failure determination counter (Cf) is set to 0 [sec], and this processing ends. If it is the PD mode, then at step S703, it is determined whether the target phase angle (Vt) is 20 [degCA] or more. If it is below 20 [degCA], then at step S704, the failure determination counter (Cf) is set to 0 [sec], and at step S705, it is determined whether the phase angle differential (dV) absolute value is 5 [degCA] or less. If it is 5 [degCA] or less, then at step S706, it is determined to be normal.

At step S703, if the target phase angle (Vt) is 20 [degCA] or more, then at step S707, it is determined whether the learning completion flag of the holding current learning value has been set. If it has been set, then at step S708, it is determined whether the detected phase angle (Vd) is 5 [degCA] or less. If it is 5 [degCA] or less, then at step S709, the failure determination counter (Cf) counts upward. If it is not 5 [degCA] or less, then at step S710, the failure determination counter (Cf) is set to 0 [sec]. At step S711, it is determined whether the failure determination counter (Cf) is 5 [sec] or more. If it is 5 [sec] or more, then at step S712, the failure is determined.

At step S707, if the learning completion flag has not been set, then at step S713, it is determined whether the detected phase angle (Vd) is 0 [degCA] or less. If it is 0 [degCA] or less, then at step S714, the failure determination counter (Cf) counts upward. If it is not 0 [degCA] or less, then at step S715, the failure determination counter (Cf) is set to 0 [sec]. At step S716, it is determined whether the failure determination counter (Cf) is 10 [sec] or more. If it is 10 [sec] or more, then at step S717, the failure is determined.

In this way, the condition triggering the failure determination counter, which is the detected phase angle condition, is switched depending on whether or not the learning of the holding current learning value is performed. Further, the condition triggering the failure determination counter, which is the detected phase angle condition, is set smaller when the learning has not yet been performed than when the holding current learning value has already been learned. Accordingly, the erroneous failure determination can be eliminated, and the failure determination precision can be improved.

Embodiment 4

Figure 8:
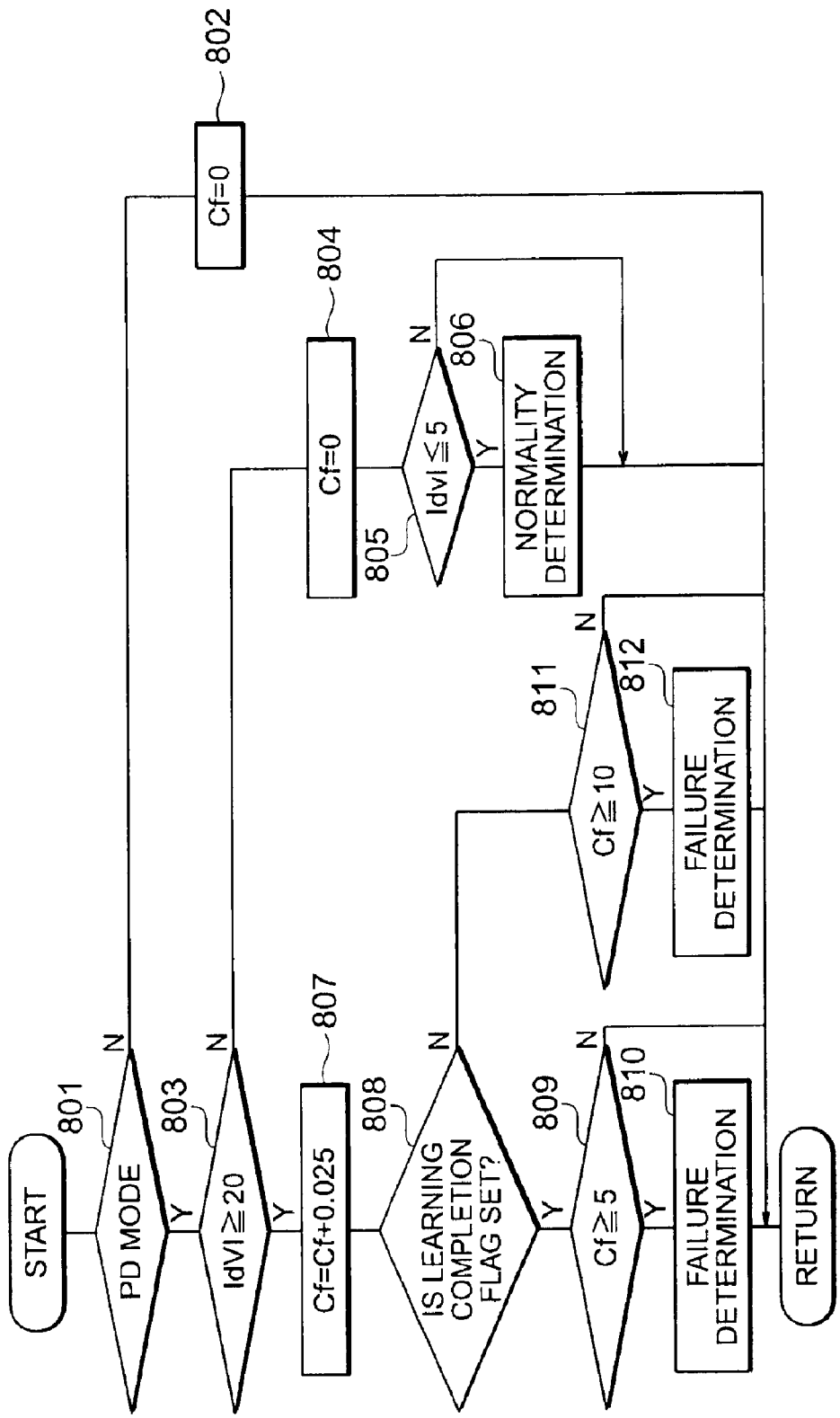
FIG. 8 is a flowchart of a failure determination according to Embodiment 4 of the present invention.

FIG. 8 is a flowchart of a failure determination according to Embodiment 4. This processing is performed at predetermined periods, for example, every 25 [ms]. First, at step S801, it is determined whether the cam control mode is the PD mode. If it is not the PD mode, then at step S802, the failure determination counter (Cf) is set to 0 [sec], and this processing ends. If it is in the PD mode, then at step S803, it is determined whether the phase angle differential (dV) absolute value is 20 [degCA] or more. If it is below 20 [degCA], then at step S804, the failure determination counter (Cf) is set to 0 [sec], and at step S805, it is determined whether the phase angle differential (dV) absolute value is 5 [degCA] or less. If it is 5 [degCA] or less, then at step S806, it is determined to be normal.

At step S803, if the phase angle differential (dV) absolute value is 20 [degCA] or more, then at step S807, the failure determination counter (Cf) counts upward. At step S808, it is determined whether the learning completion flag of the holding current learning value has been set. If it has been set, then at step S809, it is determined whether the failure determination counter (Cf) is 5 [sec] or more. If it is 5 [sec] or more, then at step S810, the failure is determined.

At step S808, if the learning completion flag has not been set, then at step S811, it is determined whether the failure determination counter (Cf) is 10 [sec] or more. If it is 10 [sec] or more, then at step S812, the failure is determined.

In this way, by setting the differential (the phase angle differential) between the target phase angle and the detected phase angle as the counting condition for the failure determination counter, when the differential is the predetermined value or more, the failure determination counter counts to perform the failure determination. Accordingly, the erroneous failure determination can be prevented, and the failure determination precision can be improved.

Embodiment 5

Figure 9:
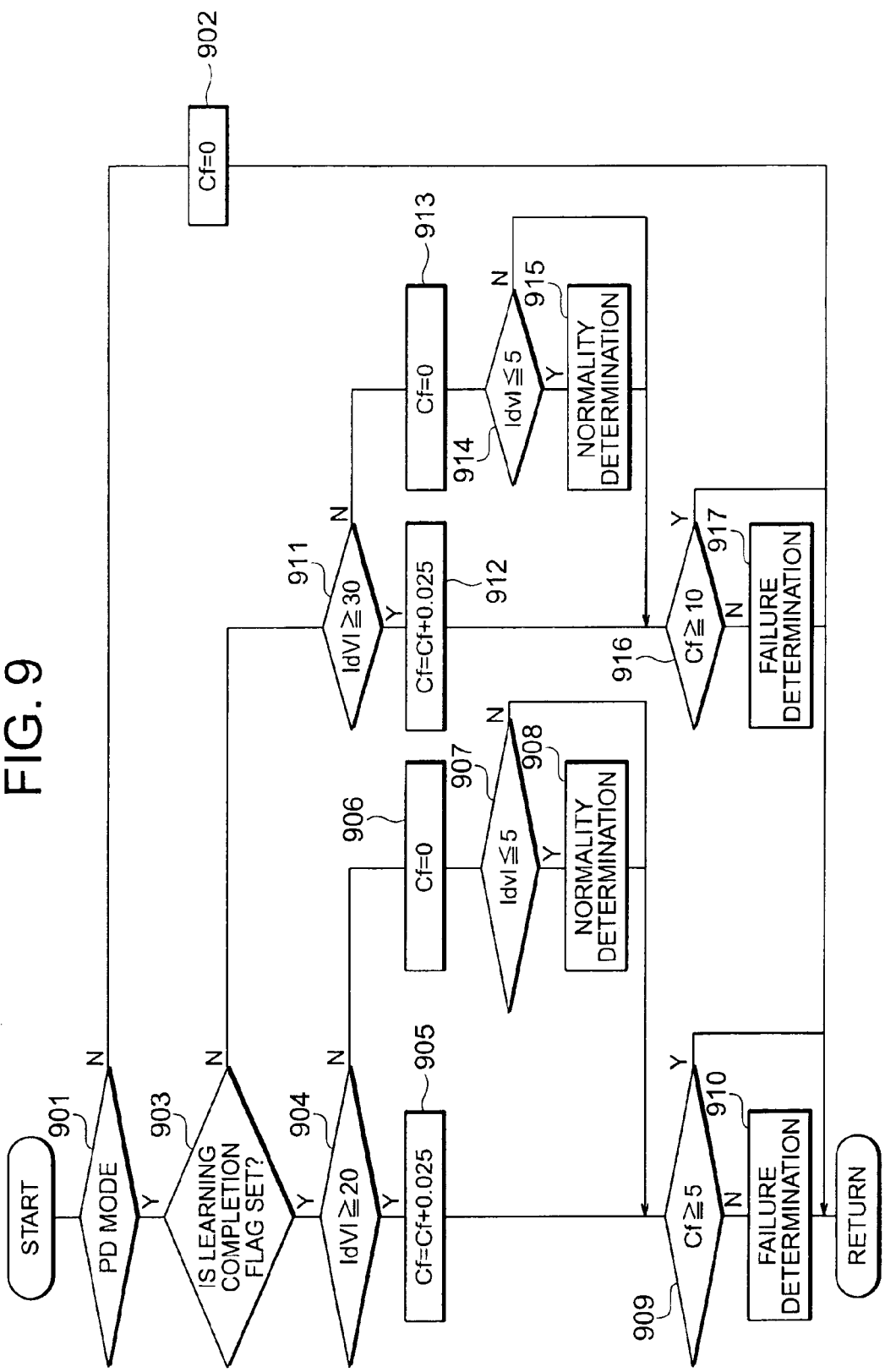
FIG. 9 is a flowchart of a failure determination according to Embodiment 5 of the present invention.

FIG. 9 is a flowchart of a failure determination according to Embodiment 5. This processing is performed at predetermined periods, for example, every 25 [ms]. First, at step S901, it is determined whether the cam control mode is the PD mode. If it is not the PD mode, then at step S902, the failure determination counter (Cf) is set to 0 [sec], and this processing ends. If it is in the PD mode, then at step S903, it is determined whether the learning completion flag of the holding current learning value has been set. If the learning completion flag has been set, at step S904, it is determined whether the phase angle differential (dV) absolute value is 20 [degCA] or more.

If the absolute value is below 20 [degCA], then at step S906, the failure determination counter (Cf) is set to 0 [sec], and at step S907, it is determined whether the phase angle differential (dV) absolute value is 5 [degCA] or less. If it is 5 [degCA] or less, then at step S908, it is determined to be normal. At step S904, if the phase angle differential (dV) absolute value is 20 [degCA] or more, then at step S905, the failure determination counter (Cf) counts upward. At step S909, it is determined whether the failure determination counter (Cf) is 5 [sec] or more. If it is 5 [sec] or more, then at step S910, the failure is determined.

At step S903, if the learning completion flag has not been set, then at step S911, it is determined whether the phase angle differential (dV) absolute value is 30 [degCA] or more. If it is below 30 [degCA], then at step S913, the failure determination counter (Cf) is set to 0 [sec], and at step S914, it is determined whether the phase angle differential (dV) absolute value is 5 [degCA] or less. If it is 5 [degCA] or less, then at step S915, it is determined to be normal.

At step S911, if the phase angle differential (dV) absolute value is 30 [degCA] or more, then at step S912, the failure determination counter (Cf) counts upward. At step S916, it is determined whether the failure determination counter (Cf) is 10 [sec] or more. If it is 10 [sec] or more, then at step S917, the failure is determined.

In this way, when the differential (the phase angle differential) between the target phase angle and the detected phase angle is the predetermined value or more, the failure determination is performed, and depending on whether or not the holding current learning has been performed, the differential (the phase angle differential) condition between the target phase angle and the detected phase angle is modified. Moreover, when the holding current learning has already been performed, the differential condition value is set smaller than at the time when the holding current has not been learned yet. Accordingly, the erroneous failure determination can be prevented, and the failure determination precision can be improved.

Embodiment 6

Figure 10:
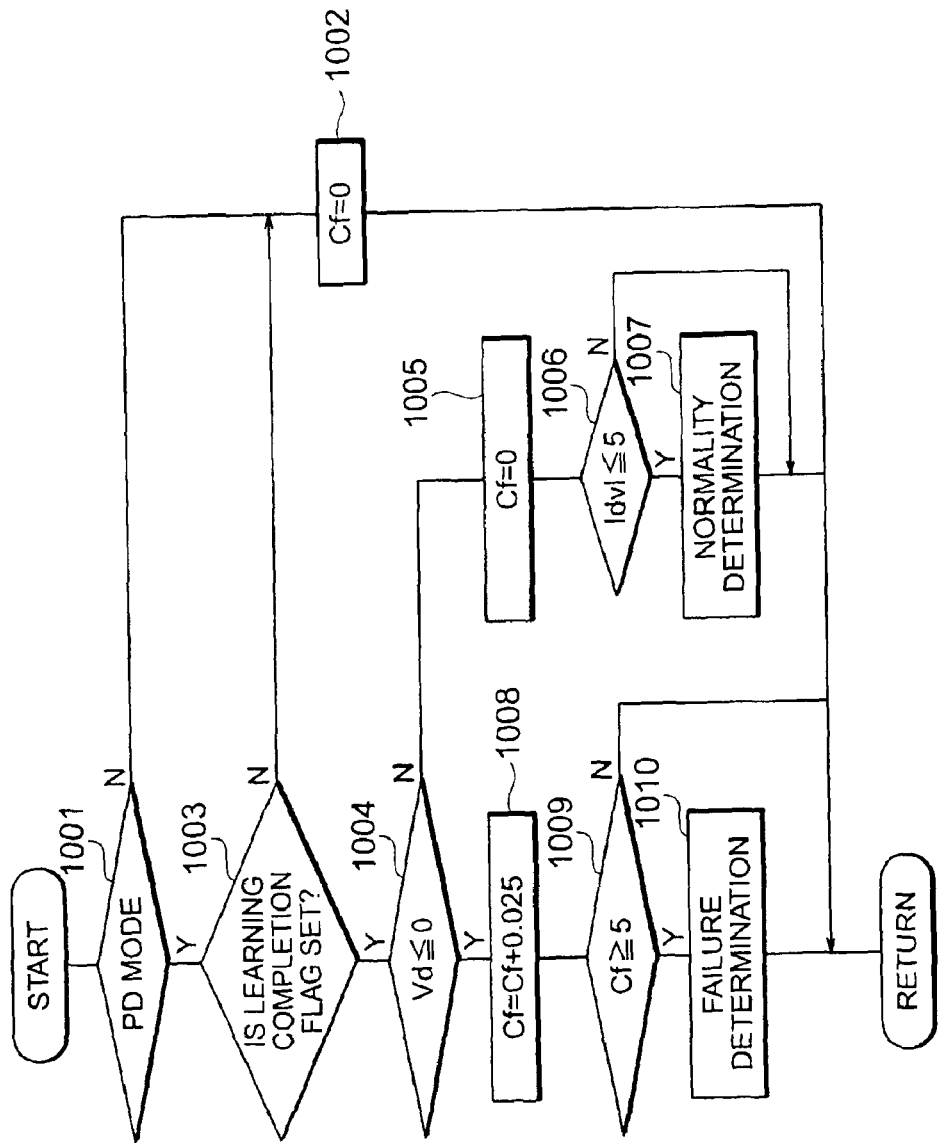
FIG. 10 is a flowchart of a failure determination according to Embodiment 6 of the present invention.

FIG. 10 is a flowchart of a failure determination according to Embodiment 6. This processing is executed at predetermined periods, for example, every 25 [ms]. First, at step S1001, it is determined whether the cam control angle is the PD mode. If it is not the PD mode, then at step S1002, the failure determination counter (Cf) is set to 0 [sec], and this processing ends. If it is the PD mode, then at step S1003, it is determined whether the learning completion flag of the holding current learning value has been set. If it has not been set, then at step S1002, the failure determination counter (Cf) is set to 0 [sec], and the processing ends.

If the flag has been set, then at step S1004, it is determined whether the detected phase angle (Vd) is 0 [degCA] or less. If it is not 0 [degCA] or less, then at step S1005, the failure determination counter (Cf) is set to 0 [sec], and at step S1006, it is determined whether the phase angle differential (dV) absolute value is 5 [degCA] or less. If it is 5 [degCA] or less, then at step S1007, it is determined to be normal.

At step S1004, if the detected phase angle (Vd) is 0 [degCA] or less, then at step S1008, the failure determination counter (Cf) counts upward. At step S1009, it is determined whether a time period of 5 [sec] or more has elapsed by the failure determination counter (Cf). If the time period of 5 [sec] or more has elapsed, then at step S1010, the failure is determined.

In this way, the failure determination is not performed at the time when the holding current learning value has not been learned. Accordingly, the erroneous determination of the failure can be eliminated, and the failure determination precision can be improved.

As described above, according to the present invention, the valve timing control system for an internal combustion engine can be provided, which can prevent the erroneous failure determination, even in a state where the control amount learning value has not yet been learned and is not yet at a correct value.

What is claimed is:

1. A valve timing control system for an internal combustion engine, comprising:
   crank angle detection means for generating a crank angle position signal corresponding to a rotational angle of a crank shaft in an internal combustion engine;
   cam angle modifying means for modifying at least a relative position of a crank shaft and a cam shaft for one of air intake and gas exhaust;
   cam angle detecting means for detecting a cam angle modified by the cam angle modifying means;
   drive means for driving the cam angle modifying means;
   target value calculating means for calculating a target value depending on an operation state of the internal combustion engine;
   cam angle control means for controlling the cam angle detected by the cam angle detecting means to coincide with the target value calculated by the target value calculating means;
   learning means for learning a control signal outputted to the drive means at a time when the target value and the cam angle substantially coincide; and
   failure detecting means for detecting a failure of the cam angle modifying means,
   wherein the failure detecting means modifies a failure detection condition according to whether or not learning is completed by the learning means.

2. A valve timing control system for an internal combustion engine according to claim 1, wherein the failure detecting means modifies a duration until the failure is detected, according to whether or not the learning is performed by the learning means as the failure detection condition.

3. A valve timing control system for an internal combustion engine according to claim 2, wherein the failure detecting means sets the duration until the failure is detected to be longer before than after the learning is performed by the learning means.

4. A valve timing control system for an internal combustion engine according to claim 1, wherein the failure detecting means uses the cam angle detected by the cam angle detecting means as the failure detection condition.

5. A valve timing control system for an internal combustion engine according to claim 4, wherein the failure detecting means sets the duration until the failure is detected to be longer before than after the learning is performed by the learning means.

6. A valve timing control system for an internal combustion engine according to claim 1, wherein the failure detecting means uses the target value calculated by the target value calculating means and the cam angle detected by the cam angle detecting means, as the failure detection condition.

7. A valve timing control system for an internal combustion engine according to claim 6, wherein the failure detecting means sets the duration until the failure is detected to be longer before than after the learning is performed by the learning means.

8. A valve timing control system for an internal combustion engine according to claim 1, wherein the failure detecting means uses a differential between the target value calculated by the target value calculating means and the cam angle detected by the cam angle detecting means, as the failure detection condition.

9. A valve timing control system for an internal combustion engine according to claim 8, wherein the failure detecting means sets a duration until the failure is detected to be longer before than after the learning is performed by the learning means.

10. A valve timing control system for an internal combustion engine according to claim 1, wherein the learning means holds a learning value even after an ignition switch is turned off.

11. A valve timing control system for an internal combustion engine according to claim 1, wherein, when the learning by the learning means is not performed, failure detection by the failure detecting means is not performed.

* * * * *